United States Patent
Gilton et al.

(10) Patent No.: US 10,877,604 B2
(45) Date of Patent: Dec. 29, 2020

(54) OPTICAL TOUCH SCREEN SYSTEM USING RADIATION PATTERN SENSING AND METHOD THEREFOR

(71) Applicant: SEMICONDUCTOR COMPONENTS INDUSTRIES, LLC, Phoenix, AZ (US)

(72) Inventors: Terry Gilton, Boise, ID (US); Victor Lenchenkov, Sunnyvale, CA (US); Brian W. Keelan, Boulder Creek, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/385,127

(22) Filed: Apr. 16, 2019

(65) Prior Publication Data

US 2019/0243511 A1     Aug. 8, 2019

Related U.S. Application Data

(62) Division of application No. 14/806,388, filed on Jul. 22, 2015, now Pat. No. 10,310,674.

(51) Int. Cl.
*G06F 3/042* (2006.01)
*G06F 3/041* (2006.01)

(52) U.S. Cl.
CPC .......... *G06F 3/0421* (2013.01); *G06F 3/0412* (2013.01)

(58) Field of Classification Search
CPC ............................. G06F 3/0421; G06F 3/0412
See application file for complete search history.

(56) References Cited

U.S. PATENT DOCUMENTS

| | | |
|---|---|---|
| 7,034,866 B1 | 4/2006 | Colmenarez et al. |
| 8,541,856 B2 | 9/2013 | Massetti |
| 8,780,087 B2 | 7/2014 | Kim |
| 2002/0001110 A1* | 1/2002 | Metz .................. G03H 1/00 359/10 |
| 2004/0140973 A1* | 7/2004 | Zanaty ................ H04N 5/335 345/214 |
| 2005/0008052 A1* | 1/2005 | Nomura ............... H01L 27/322 372/39 |
| 2006/0091288 A1* | 5/2006 | Keam .................. G06K 9/2036 250/208.1 |

(Continued)

OTHER PUBLICATIONS

Gunther Wernicke et al.; "Liquid crystal display as spatial light modulator for diffractive optical elements and the reconstruction of digital holograms"; Proceedings of SPIE; vol. 4596; 2001; pp. 182-190; 9 pages.

*Primary Examiner* — Hong Zhou
(74) *Attorney, Agent, or Firm* — Polansky & Associates, P.L.L.C.; Paul J. Polansky

(57) ABSTRACT

In one form, an optical touch screen system includes a semiconductor body forming a hybrid display and image sensor comprising a plurality of display pixels interspersed with a plurality of image sensor pixels, a spatial light modulator overlying a surface of the hybrid display and image sensor, and a control circuit for driving the plurality of display pixels with a first pattern and measuring a second pattern of the plurality of image sensor pixels, the control circuit analyzing the second pattern to detect a position of an object and selectively detecting a touch location in response to the second pattern.

16 Claims, 5 Drawing Sheets

(56) References Cited

U.S. PATENT DOCUMENTS

| | | | | |
|---|---|---|---|---|
| 2008/0150848 | A1* | 6/2008 | Chung | G06F 3/0412 |
| | | | | 345/82 |
| 2010/0007632 | A1* | 1/2010 | Yamazaki | G06F 21/32 |
| | | | | 345/175 |
| 2010/0060611 | A1* | 3/2010 | Nie | G06F 1/3203 |
| | | | | 345/175 |
| 2011/0108707 | A1* | 5/2011 | Cui | G01N 21/4795 |
| | | | | 250/208.1 |
| 2011/0248960 | A1* | 10/2011 | Gruhlke | G06F 3/0428 |
| | | | | 345/175 |
| 2012/0147468 | A1* | 6/2012 | Bell | G02B 5/201 |
| | | | | 359/491.01 |
| 2012/0313867 | A1* | 12/2012 | Luo | G02B 30/00 |
| | | | | 345/173 |
| 2014/0192023 | A1* | 7/2014 | Hoffman | G06F 3/0421 |
| | | | | 345/175 |
| 2015/0083917 | A1* | 3/2015 | Wyrwas | G02B 26/02 |
| | | | | 250/341.1 |
| 2015/0177438 | A1* | 6/2015 | Drolet | G02B 6/0035 |
| | | | | 349/65 |
| 2015/0331508 | A1* | 11/2015 | Nho | H01L 27/323 |
| | | | | 345/173 |

* cited by examiner

OPTICAL TOUCH SCREEN SYSTEM USING RADIATION PATTERN SENSING AND METHOD THEREFOR

This application is a division of U.S. patent application Ser. No. 14/806,388, filed Jul. 22, 2015.

FIELD OF THE DISCLOSURE

The present disclosure relates generally to touch screens, and more particularly to optical touch screen systems.

BACKGROUND

Touch screens are input devices that are useful in a variety of computer-based products, including cell phones, personal data assistants (PDAs), electronic books, point of sale terminals, and the like. Touch screens are usually formed with thin, transparent films that overlay a display so that the user can interact intuitively with objects and scenes on the display.

There are several known types of touch screens, including resistive, capacitive, infra-red, and acoustic. Capacitive touch screens have become the most popular due to their low cost, relative accuracy, and ability to detect multiple touches. Capacitive touch screens work by detecting small changes in capacitance due to the user's finger touching or being in close proximity to the screen. However because they rely on small changes in capacitance, capacitive touch screens are sensitive to false touch detections cause by, e.g., dust, water, etc. as well as to electromagnetic interference (EMI). Moreover it is difficult to discriminate between actual touches and objects such as fingers being in close proximity to the screen. In addition, capacitive touch screens cannot readily be scaled up in size because the signal discrimination becomes too low.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

An optical touch screen system as disclosed in some embodiments presented herein relies on the property that light transmitted through an enclosure will exhibit a standing wave interference pattern that can be perturbed by a nearby object such as a finger, stylus, etc. By sensing the pattern in an untouched condition as a baseline, touches can be detected by comparing a pattern subsequently measured with the pattern in the untouched condition, and using a perturbation in the standing wave pattern to locate the position of the touch.

According to other embodiments, an optical touch screen system includes a semiconductor body forming a hybrid display and image sensor that includes an array of display pixels interspersed with an array of image sensor pixels, and a control circuit. The control circuit drives one or more display pixels with a first pattern and measures a second pattern using the image sensor pixels. The control circuit analyzes the second pattern to detect a size and position of an object, such as a finger or a stylus, and to selectively detect a touch location in response to the second pattern. In some embodiments, the optical touch screen system also includes a spatial light modulator overlying a surface of the hybrid display and image sensor. In one form the spatial light modulator is a diffraction grating, and the control circuit measures a position of the object by activating a display pixel and measuring reflected light in a plurality of adjacent image sensor pixels. In another form, the optical touch screen system activates multiple display pixels and uses the spatial light modulator to create a hologram of a nearby object.

Figure 1:
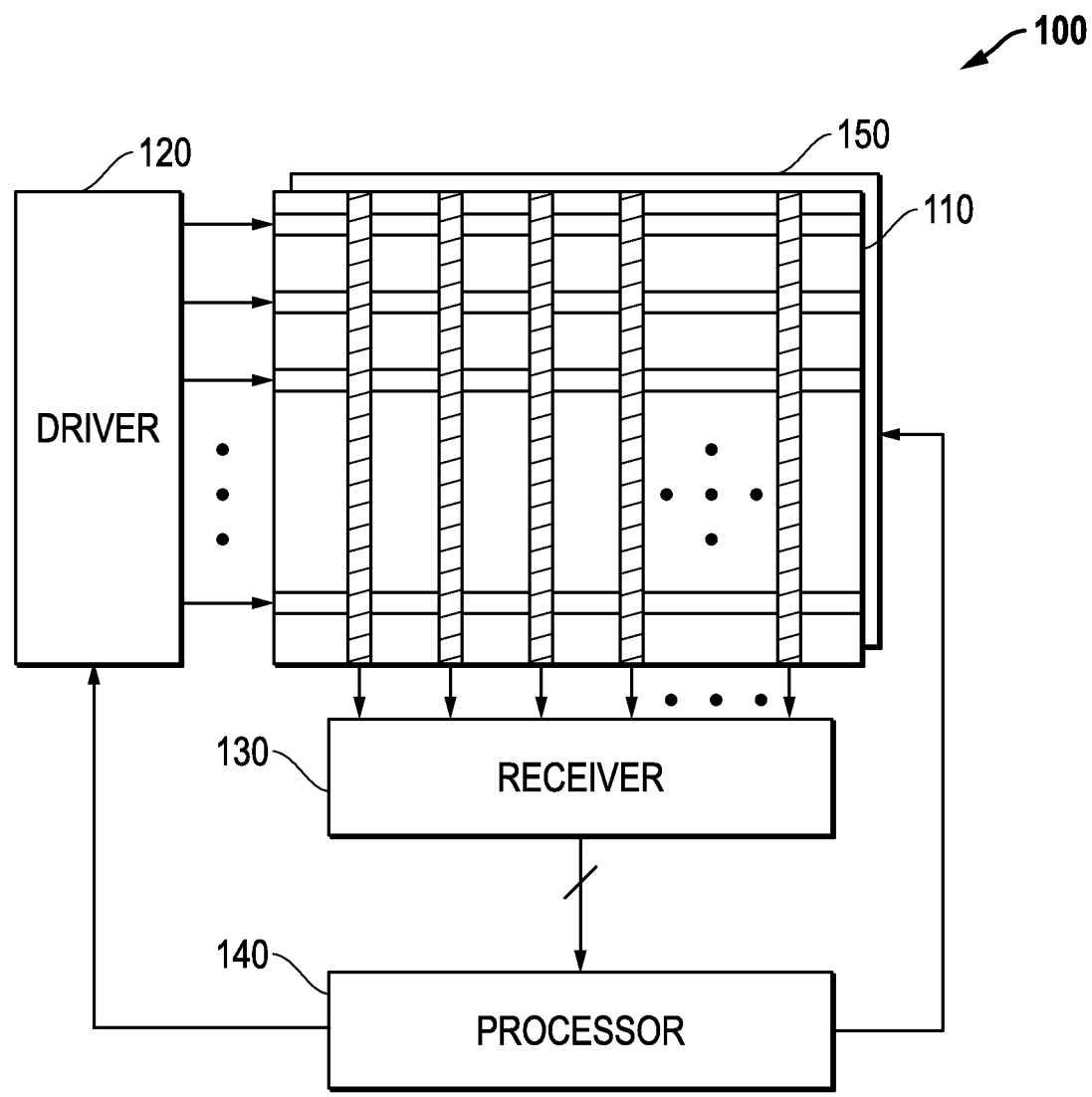
FIG. 1 illustrates in partial block diagram and partial top view a capacitive touch screen system known in the prior art.

FIG. 1 illustrates in partial block diagram and partial top view a capacitive touch screen system 100 known in the prior art. Capacitive touch screen system 100 includes generally a touch screen 110, a driver 120, a receiver 130, a processor 140, and a display 150. Touch screen 110 is a rectangular transparent screen having vertical conductors overlying and crossing horizontal conductors, with intersections thereof representing potential touch locations. Processor 140 has an output coupled to an input of driver 120 to control driver 120 to provide signals to the horizontal conductors. Receiver 130 has inputs connected to the vertical conductors to detect capacitance changes and provide the measurements to processor 140. Display 150 is underneath touch screen 110 such that a user can interact intuitively with objects or images on display 150.

For example, driver 120 can use the capacitance in the horizontal conductors to form an oscillator whose frequency is determined by the capacitance. Receiver 130 then measures the frequency on the vertical conductors and detects a touch by sensing a difference in oscillation frequency compared to an untouched condition. Processor 140 detects a touch at the row and column corresponding to the detected frequency deviation. Other ways of measuring changes in capacitance are also possible.

While capacitive touch screen system 100 is low cost and reasonably reliable, the small capacitance between the conductors can also be disturbed by other objects besides the human finger, such as water drops. Also EMI can cause false detections. Moreover capacitive touch screen system 100 has difficulty in distinguishing near touches from actual touches so that it can be hyper-sensitive.

Figure 2:
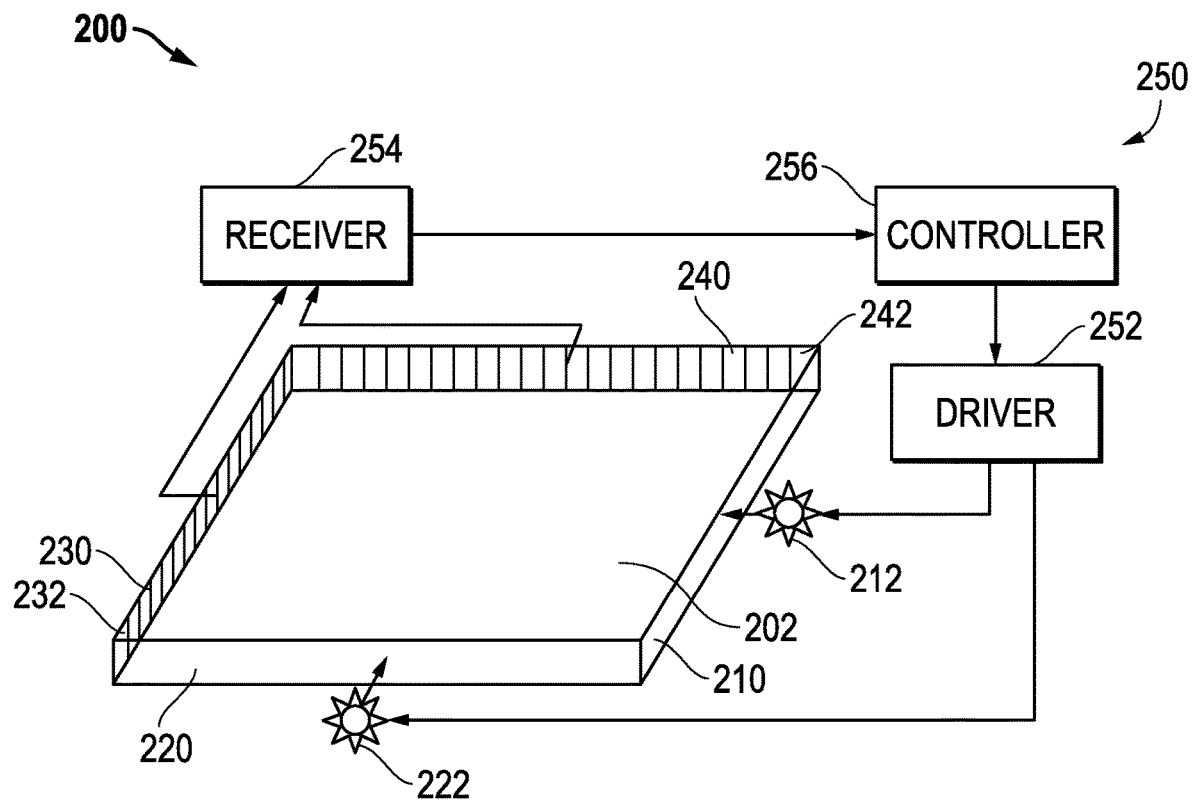
FIG. 2 illustrates in partial block diagram and partial perspective view an optical touch screen system according to various embodiments.

FIG. 2 illustrates in partial block diagram and partial perspective view an optical touch screen system 200 according to various embodiments. Optical touch screen system 200 includes generally an optically transmissive medium 202, light sources 212 and 222, optical detectors 232 and 242, and a control circuit 250.

Optically transmissive medium 202 is a generally transparent thin film formed by known organic or inorganic materials. For example in one embodiment, optically transmissive medium 202 can be formed with $TiO_2$, which has a relatively high index of refraction of about 2.6. Optically transmissive medium 202 has a first side 210, a second side 220, a third side 230, and a fourth side 240. Light source 212 is positioned at or near first side 210 for emitting light from first side 210 toward third side 230. Light source 222 is positioned at or near second side 220 for emitting light from second side 220 toward fourth side 240. Light sources 212 and 222 are any suitable optical emitters which may emit partially or substantially coherent light. Examples of light sources 212 and 222 will be described below. In one particular embodiment, light sources 212 and 222 emit light at different wavelengths.

Optical detector 232 is a set of photodetectors arranged along third side 230. Each such photodetector can be a single image sensor pixel or an array of image sensor pixels. Although shown in FIG. 2 as being arranged along a depth of optically transmissive medium 202, as will be described later, the photodetectors can also be arranged in a plane underneath optically transmissive medium 202. Likewise, optical detector 242 is a similar set of photodetectors arranged along fourth side 240.

Control circuit 250 includes a driver 252, a receiver 254, and a controller 256. Driver 252 has an input, and outputs connected to each of light sources 212 and 222 for providing activation signals thereto. Receiver 254 has inputs connected to optical detectors 232 and 243, and an output. Controller 256 has an input connected to the output of receiver 254, and an output connected to the input of driver 252. In one exemplary embodiment, optical detectors 232 and 242 each include horizontal charge coupled devices (CCDs) for capturing and transferring the signals received by each photodetector in sequence to receiver 254, and receiver 254 includes amplifiers and analog-to-digital converters (ADCs) to convert the signal provided by each CCD into digital signals representative of received light intensity for further processing. In other embodiments, optical detectors 232 and 242 can be implemented with active pixel sensors using complementary metal oxide semiconductor (CMOS) technology.

According to various particular embodiments to be described below, optical touch screen system 200 relies on light sources 212 and 222 to establish standing wave patterns in optically transmissive medium 202. Optical detectors 232 and 242 are capable of detecting the standing wave patterns along sides 230 and 240, respectively. In addition, optical touch screen system 200 also relies on the fact that a touch, such as a finger in close proximity to the top surface of optically transmissive medium 202, perturbs the standing wave pattern. Controller 256 uses light sources 212 and 222 to determine a first standing wave pattern in an untouched condition, and then a second standing wave pattern in a touched condition. Controller 256 determines a touch location in response to a difference between the first and second standing wave patterns. Note that controller 256 may infer the touch location using a complex transform between the pattern and the location.

As will be described with respect to several particular embodiments below, optical touch screen system 200 provides several improvements over the capacitive touch approach. First since it relies on the proximity of a physical object that is capable of reflecting light, the touch detection will not be susceptible to EMI and will even detect the presence of electrically insulated objects such as gloved fingers. Second, the touch detection is holographic, and thus the approach of an object toward the screen can be detected as well as the object's size and shape. This capability allows touch detection software to filter out extraneous objects such as a water drop. Third, the detection of the standing wave patterns can be performed with pre-existing elements, allowing low cost implementation.

Figure 3:
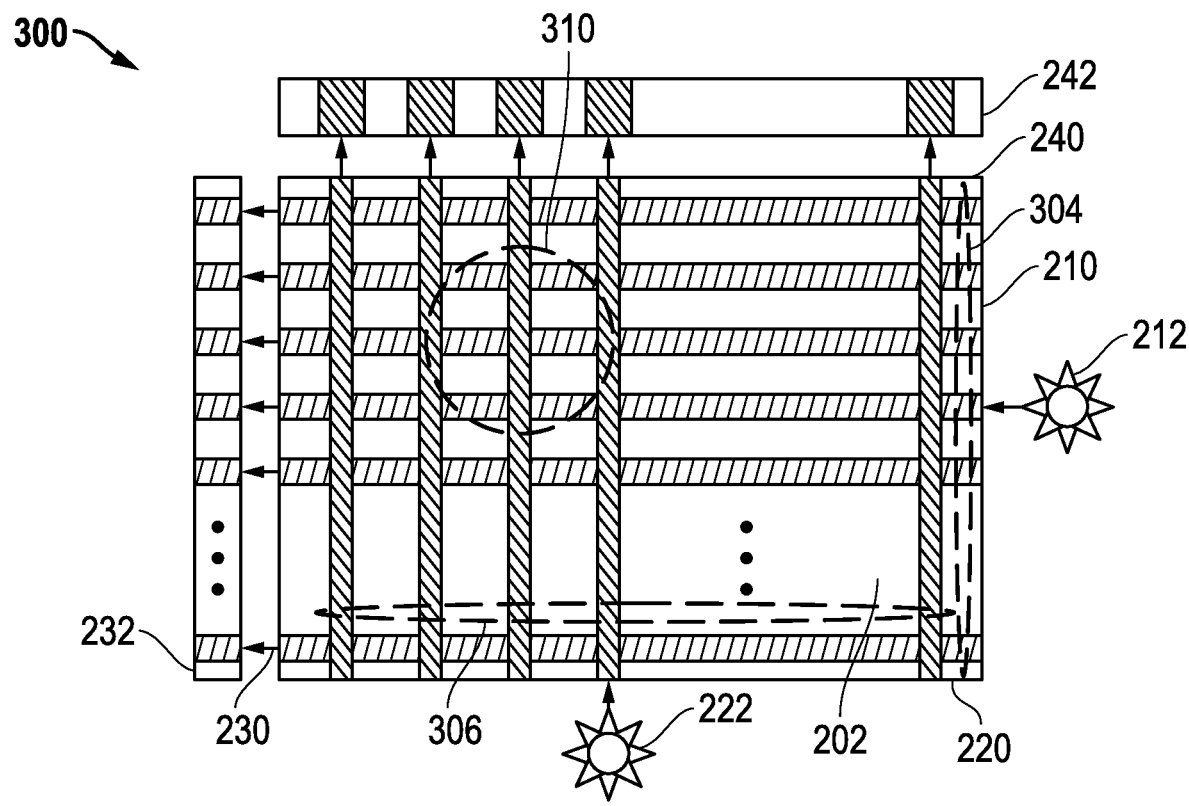
FIG. 3 illustrates a top view of an optical touch screen system according to a first particular embodiment.

FIG. 3 illustrates a top view of an optical touch screen system 300 according to a first particular embodiment. In optical touch screen system 300, optically transmissive medium 202 is formed with a set of discrete fibers including a first set of horizontal fibers 304 and a second set of vertical fibers 306. Each of the fibers can be formed with any suitable optically transmissive material, such as $TiO_2$. In this regard, light sources 212 and 222 provide polarized light, such that some light escapes. A touch, such as touch area 310, affects the amplitude of signals received by optical detectors 232 and 242. In particular, a touch represented by touch area 310 above optical touch screen 300 will cause a perturbation in the fibers, and a correlation can be found between the horizontal and vertical position and shape of the perturbation with detected signals in optical detectors 232 and 242.

Figure 4:
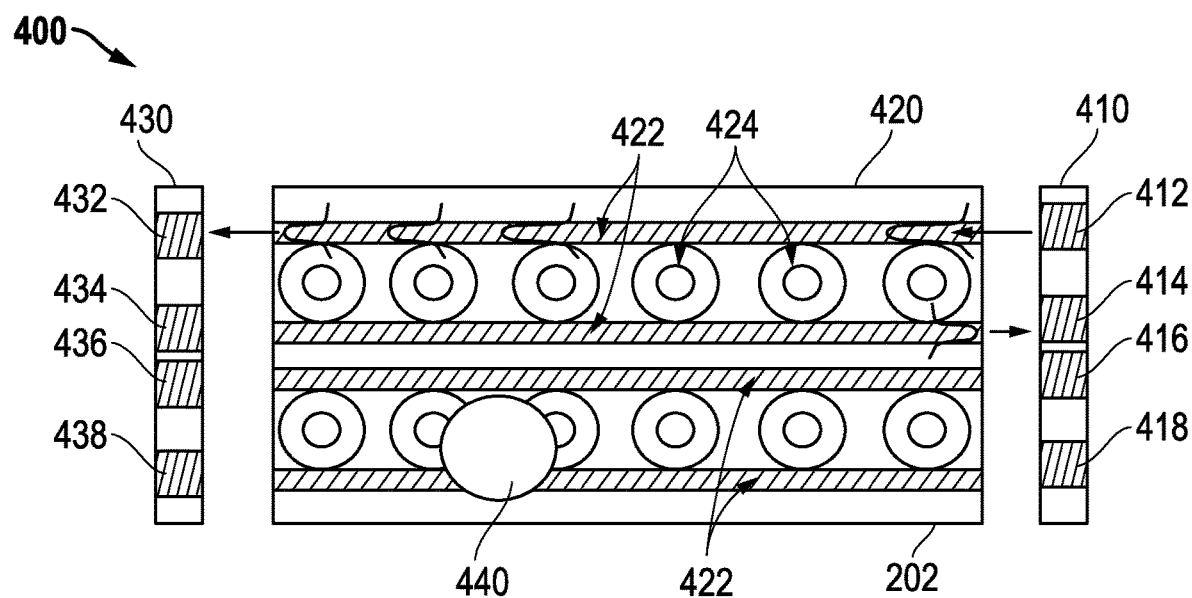
FIG. 4 illustrates a top view of an optical touch screen system according to a second particular embodiment.

FIG. 4 illustrates a top view of an optical touch screen system 400 according to a second particular embodiment. Optical touch screen system 400 includes optically transmissive medium 202 in which a representative portion 420 is shown in FIG. 4. Portion 420 includes a set of fibers 422 extending horizontally with sets of circular cavities 424 between every other pair of fibers 422. Each of the fibers and circular cavities can be formed with any suitable optically transmissive material, such as $TiO_2$. On a right side is a linear array of detectors 410, and on a left side is a linear array of detectors 430. Each linear array of detectors includes display pixels interspersed with image sensor pixels with gaps corresponding to the spaces between adjacent fibers 422. Linear array of detectors 410 includes a photoemitter 412, a photodetector 414, a photoemitter 416, and a photodetector 418. Linear array of detectors 430 includes a photodetector 432, a photoemitter 434, a photodetector 436, and a photoemitter 438. Thus photoemitter 412 is on a right side and photodetector 432 on a left side of a first fiber, photoemitter 434 is on a left side and photodetector 414 is on a right side of a second fiber, and so on.

Circular cavities 424 act to partially couple light from one fiber into an adjacent fiber such that the intensity of the incident light is split by circular cavities 424 into forward and backward components. The intensity of the forward and backward components changes from emitter to detector due to the coupling of light into different numbers of circular cavities. This characteristic allows a touch above the array at a particular position to perturb the forward and backward components in a way that can be detected and correlated to touch position.

For example assume there is a touch 440 as shown in FIG. 4. Touch 440 perturbs the forward component sensed by detector 436 as well as the backward component sensed by photodetector 418. The perturbation can be sensed by comparison with the forward and backward signals from the unperturbed fibers.

In one embodiment of an optical touch screen system using portion 420, another layer with fibers extending orthogonally to fibers 422 will overlie or underlie portion 420. Control circuit 250 will use measurements from this additional layer to determine X and Y coordinates of touch 440. In another embodiment, an optical touch screen system includes a single layer with fibers extending in only one direction, and uses the forward and backward components to detect not only the rows affected by touch 440 but also the position along the rows. However this other embodiment does not produce as accurate a touch location as an optical touch screen system that uses two orthogonal layers.

Figure 5:
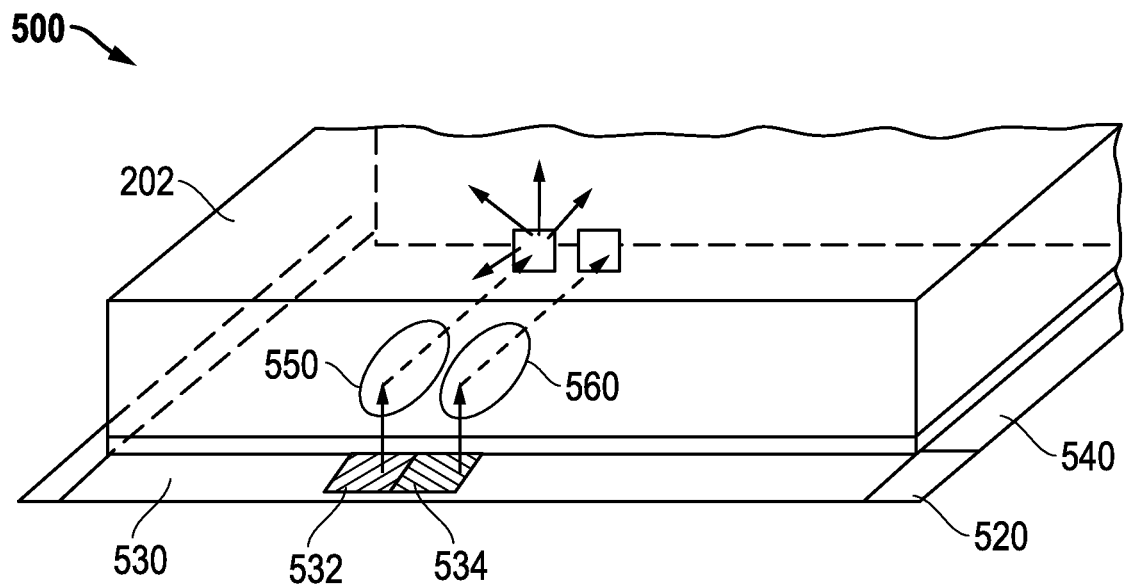
FIG. 5 illustrates in partial block diagram and partial perspective view an optical touch screen system according to a third particular embodiment.

FIG. 5 illustrates in partial block diagram and partial perspective view an optical touch screen system 500 according to a third particular embodiment. Optical touch screen system 500 includes optically transmissive medium 202 overlying a display layer 520. Display layer 520 includes edge rows of pixels 530 and 540 extending beyond the edges of optically transmissive medium 202. Edge row of pixels 530 includes a red pixel 532 and a green pixel 534 that are used as light sources. Optical touch screen system 500 repurposes normal display pixels in edge rows to operate as light sources for establishing the standing wave patterns in optically transmissive medium 202. The red and green light is emitted by pixels 532 and 534 generally in an upward direction but is redirected through optically transmissive medium 202 parallel to the plane of display layer 520 by prism elements 550 and 560, respectively. As before, the red and green light create standing wave patterns that can be measured in the untouched condition, and differences between the measurement in the untouched condition and current measurements can be used to detect touch locations.

The re-use of edge pixels allows flexible operation at low cost by re-purposing a portion of the existing display array. It also allows various modulation modes for more accurate touch detection, including temporal encoding, wavelength encoding, spatial encoding (the prism elements can collect light from several LEDs), and polarization encoding. If there are multiple polarizations, pulse timings, and/or wavelength ranges of light sources along with pixels that can distinguish among them, then multiple somewhat independent perturbation patterns can be computed. Thus multiple determinations of position can be made, leading to a more robust overall touch position determination. In particular, if the timing or polarizations are interleaved (e.g., odd light sources have one state, and even light sources another), crosstalk can be reduced, improving resolution.

Figure 6:
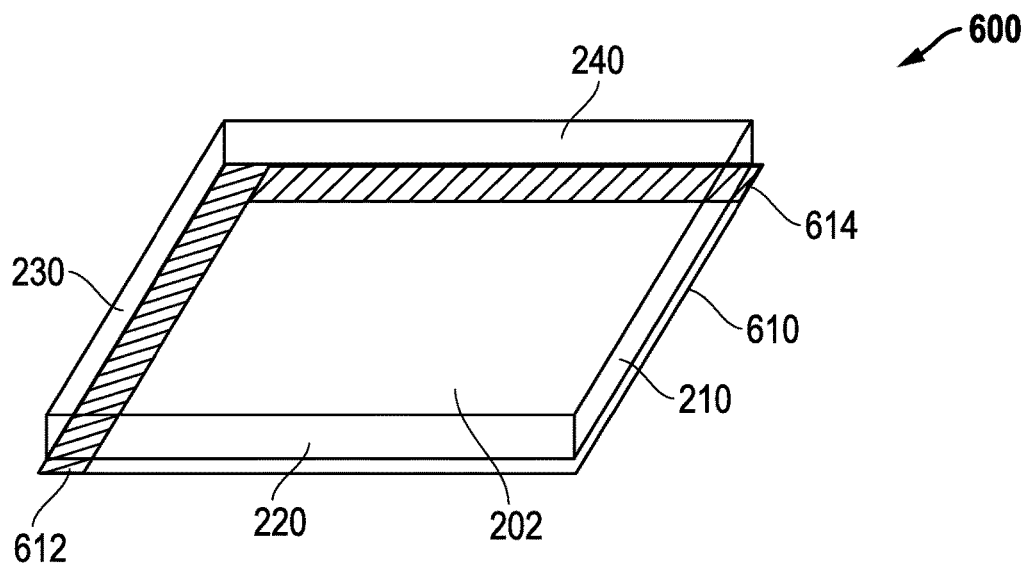
FIG. 6 illustrates in partial block diagram and partial side view an optical touch screen system according to a fourth particular embodiment.

FIG. 6 illustrates in partial block diagram and partial perspective view an optical touch screen system 600 according to a fourth particular embodiment. Optical touch screen system 600 includes optically transmissive medium 202 overlying a display plane 610. Optically transmissive medium 202 includes a first side 210 and a second side 220 and adjacent light sources 212 and 222. Display plane 610 includes a main display area 612 as well as a sensor array 614 near third side 230 and a sensor array 616 near fourth side 640. Optical touch screen system 600 uses sensor arrays 614 and 616 instead of 232 and 242 based on the fact that the standing wave pattern in optically transmissive medium 202 will reflect a certain pattern onto display plane 610 that will also be perturbed by a touch. While losing some sensitivity compared to an optical touch screen system using sensors along the edges, it can be manufactured easily and cheaply and so will be appropriate for many applications.

Figure 7:
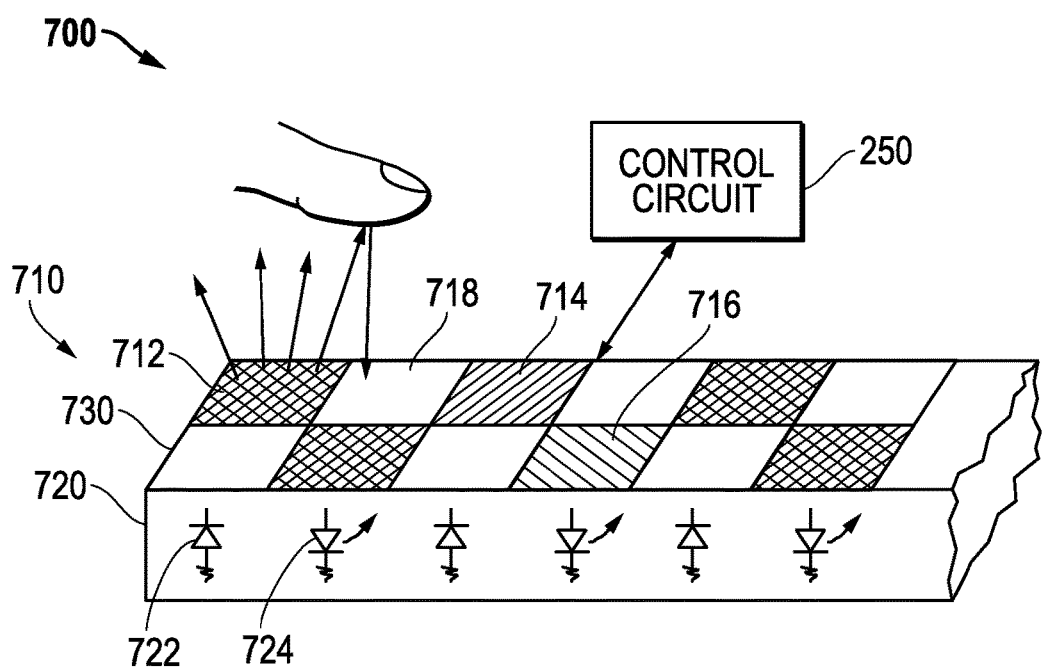
FIG. 7 illustrates in partial block diagram and partial perspective view an optical touch screen system according to a fifth particular embodiment.

FIG. 7 illustrates in partial block diagram and partial perspective view an optical touch screen system 700 using a hybrid display and optical sensor 710 according to a fifth particular embodiment. Optical touch screen system 700 includes a semiconductor substrate 720 forming hybrid display and optical sensor 710 connected to control circuit 250. Hybrid display and optical sensor 710 includes an array of display pixels shown as shaded blocks such as representative display pixels 712, 714, and 716 intermixed in a checkerboard pattern with an array of image sensor pixels shown as clear blocks such as representative image sensor pixel 718.

Hybrid display and optical sensor 710 includes semiconductor substrate 720 and a color filter array 730. In semiconductor substrate 720 each pixel is formed with a PN junction diode, in which image sensor pixels use reverse biased diodes such as exemplary diode 722 and display pixels use forward biased diodes such as exemplary diode 724. Color filter array 730 overlies semiconductor substrate 720 and creates green, red, and blue display pixels such as green display pixels 712, a red display pixel 714, and a blue display pixel 716 arranged generally in a modified Bayer pattern. The modified Bayer pattern includes green, red, and blue display pixels in the ratio of 2:1:1 like a conventional Bayer filter, but is modified to include an array of image sensor pixels with an image sensor pixel in between each pair of adjacent display pixels Like the display pixels, the image sensor pixels use a color filter array in a modified Bayer pattern.

While image sensor pixels are typically smaller than display pixels, in optical touch screen system 700 they are made the same size for ease of manufacturing. In an alternative embodiment, each image sensor pixel can be implemented with an array of smaller image sensors.

Control circuit 250 activates the array of display pixels and captures an image using the array of image sensor pixels to determine the position of an object such as a finger or stylus from the surface. The position includes the planar coordinates as well as the distance from the surface of the hybrid display and image sensor. Control circuit 250 intelligently measures this distance by measuring the intensity of reflected light near an object at neighboring image sensor pixels such that it can accurately discriminate between touches and near touches. Semiconductor substrate 720 and color filter array 730 are inexpensive to manufacture and optical touch screen system 700 does not need a separate optically transmissive layer, but control circuit 250 needs additional processing capability to locate objects and to measure the position of the objects based on the reflected light pattern and intensity.

Hybrid display and optical sensor 710 can also be used with other elements to form optical touch screen systems that provide various advantages compared to capacitive touch screens. Two such examples will now be explained.

Figure 8:
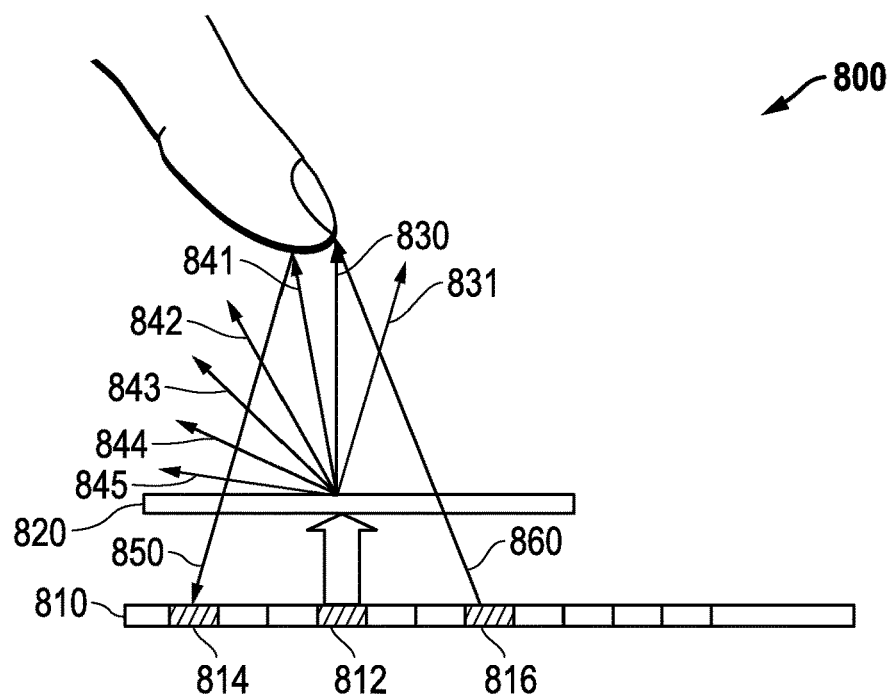
FIG. 8 illustrates a side view of an optical touch screen system using a hybrid display and optical sensor according to a sixth particular embodiment.

FIG. 8 illustrates a side view of an optical touch screen system 800 using a hybrid display and optical sensor 810 according to a sixth particular embodiment. Optical touch screen system 800 includes hybrid display and optical sensor 810 and a spatial light modulator in the form of a grating 820 overlying but separated from hybrid display and optical sensor 810. Hybrid display and optical sensor 810 includes an array of display pixels interspersed with an array of image sensor pixels, and is constructed similarly to hybrid display and optical sensor 710 of FIG. 7. As shown in FIG. 8, hybrid display and optical sensor 810 includes an exemplary blue display pixel 812 and exemplary adjacent blue image sensor pixels 814 and 816.

Grating 820 is a diffraction grating with a periodic structure that splits and diffracts light into several beams or "grating orders", which represent maxima of intensity of the diffracted light. Shown in FIG. 8 is a main beam 830 corresponding to grating order 0, a beam 831 displaced to the right by a predetermined angle and having a grating order of +1, and a set of beams 840 displaced to the left including a beam 841 having a grating order of −1, a beam 842 having a grating order of −2, a beam 843 having a grating order of −3, a beam 844 having a grating order of −4, and a beam 845 having a grating order of −5.

As shown in FIG. 8, when display pixel 812 is activated, beam 830 is reflected into pixel 816 and beam 841 is reflected into image sensor pixel 814. By analysis of the pattern of reflected light through grating 820, it is possible for control circuit 250 to detect the shape and distance of an object near the surface of hybrid display and optical sensor 810. For this purpose, grating 820 is useful in easily and accurately measuring the position.

Figure 9:
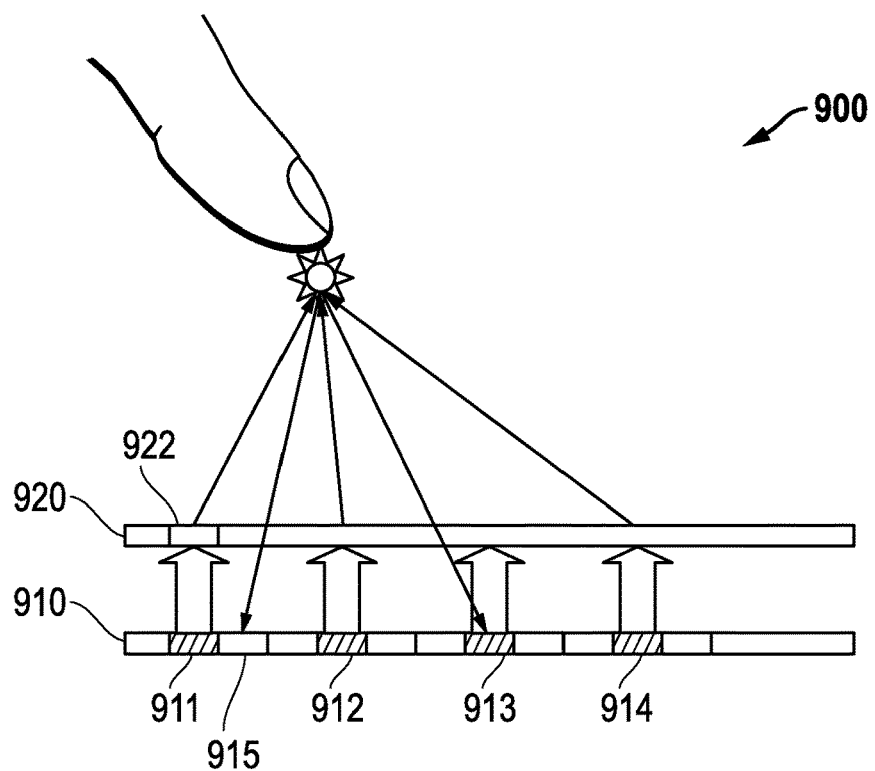
FIG. 9 illustrates a side view of an optical touch screen system using a hybrid display and optical sensor according to a seventh particular embodiment.

FIG. 9 illustrates a side view of an optical touch screen system 900 using a hybrid display and optical sensor 910 according to a seventh particular embodiment. Optical touch screen system 900 includes a spatial light modulator 920 overlying but separated from hybrid display and optical sensor 910. Hybrid display and optical sensor 910 again includes a semiconductor body having an array of display pixels interspersed with an array of image sensor pixels and an overlying color filter array, and is constructed similarly to hybrid display and optical sensor 710 of FIG. 7. In hybrid display and optical sensor 910, each display pixel emits coherent or partially coherent light. However unlike optical touch screen system 800, control circuit 250 causes hybrid display and optical sensor 910 to activate many pixels, such as blue pixels 911-914 shown in FIG. 9, at the same time, each pixel emitting coherent or partially coherent light.

Spatial light modulator 920 refracts, redirects, and phase matches light from multiple coherent display pixels to form a free space three-dimensional standing wave pattern, i.e. a hologram, of the nearby object. The hologram can then be detected by the array of image sensor pixels such as exemplary image sensor pixel 915 to analyze the object to determine the shape of the object and the distance of the object from the surface of optical touch screen system 900. Optical touch screen system 900 can use different types of spatial light modulators, including liquid crystal display (LCD), acousto-optic, and electro-optic modulators. LCD modulators are the slowest of the three but are well-known and have been extensively developed for consumer electronic applications. Acousto-optic and electro-optic modulators are faster but less well developed.

Thus with the aid of a spatial light modulator (such as a diffraction grating or LCD modulator), the underlying hybrid display and image sensor is able to more accurately and efficiently develop position information of the nearby object, simplifying the processing task of control circuit 250.

The above-disclosed subject matter is to be considered illustrative, and not restrictive, and the appended claims are intended to cover all such modifications, enhancements, and other embodiments that fall within the true scope of the claims. For example various materials can be used for form optically transmissive layers, fibers, and circular cavities. Moreover an underlying display layer can be repurposed to include image sensor pixels to measure the standing wave patterns and the perturbations of these patterns. In addition, various other elements can be added to the optical touch screen system to facilitate the touch detection, such as external light sources, prisms, gratings, and spatial light modulators.

Thus, to the maximum extent allowed by law, the scope of the present invention is to be determined by the broadest permissible interpretation of the following claims and their equivalents, and shall not be restricted or limited by the foregoing detailed description.

What is claimed is:

1. An optical touch screen system comprising:
   a semiconductor body forming a hybrid display and image sensor comprising a plurality of display pixels interspersed with a plurality of image sensor pixels;
   a spatial light modulator overlying a surface of said hybrid display and image sensor, wherein said spatial light modulator comprises a diffraction grating that splits light from said plurality of display pixels into a plurality of grating orders; and
   a control circuit for driving said plurality of display pixels with a first pattern and measuring a second pattern of said plurality of image sensor pixels, said control circuit analyzing said second pattern to detect a position of an object and selectively detecting a touch location in response to said second pattern.

2. The optical touch screen system of claim 1, wherein said control circuit measures said position of said object by activating a display pixel and measuring reflected light in a plurality of adjacent image sensor pixels.

3. The optical touch screen system of claim 1, wherein said plurality of display pixels are interspersed with said plurality of image sensor pixels in a checkerboard pattern.

4. The optical touch screen system of claim 1, wherein said plurality of display pixels and said plurality of image sensor pixels have the same size.

5. The optical touch screen system of claim 1, further comprising:
   a color filter array overlying at least said plurality of display pixels.

6. The optical touch screen system of claim 5, wherein said color filter array comprises a first plurality of green, red, and blue filter elements overlying said plurality of display pixels in a ratio of 2:1:1.

7. The optical touch screen system of claim 6, wherein said color filter array comprises a second plurality of green, red, and blue filter elements overlying said plurality of image sensor pixels in the ratio of 2:1:1 to form a modified Bayer filter.

8. An optical touch screen system comprising:
   a semiconductor body forming a hybrid display and image sensor comprising a plurality of display pixels interspersed with a plurality of image sensor pixels, wherein each of said plurality of display pixels and said plurality of image sensor pixels have the same size, and wherein said plurality of display pixels are interspersed with said plurality of image sensor pixels in a checkerboard pattern; and
   a control circuit for driving said plurality of display pixels with a first pattern and measuring a second pattern of said plurality of image sensor pixels, said control circuit analyzing said second pattern to detect a position of an object and selectively detecting a touch location in response to said second pattern.

9. The optical touch screen system of claim 8, further comprising:
   a color filter array overlying at least said plurality of display pixels.

10. The optical touch screen system of claim 9, wherein said color filter array comprises a first plurality of green, red, and blue filter elements overlying said plurality of display pixels in a ratio of 2:1:1.

11. The optical touch screen system of claim 10, wherein said color filter array comprises a second plurality of green, red, and blue filter elements overlying said plurality of image sensor pixels in the ratio of 2:1:1 to form a modified Bayer filter.

12. The optical touch screen system of claim 8, further comprising a spatial light modulator overlying a surface of said hybrid display and image sensor.

13. A method of detecting a touch in an optical touch screen system, comprising:
 providing a semiconductor substrate having an array of display pixels interspersed with an array of image sensor pixels in a checkerboard pattern, thereby forming a hybrid display and optical sensor;
 activating a plurality of display pixels at the same time, thereby causing said hybrid display and optical sensor to emit coherent light;
 modulating said coherent light using a spatial light modulator, thereby forming a hologram of a nearby object; and
 detecting said hologram using said array of image sensor pixels.

14. The method of claim 13, wherein said modulating comprises:
 refracting, redirecting, and phase matching said coherent light using said spatial light modulator.

15. The method of claim 13, further comprising:
 determining a shape of said nearby object and a distance of said nearby object from a surface of said semiconductor substrate in response to detecting said hologram.

16. The method of claim 13, wherein:
 the method further comprises filtering said array of display pixels using a color filter array having a plurality of colors; and
 said activating said plurality of display pixels comprises activating pixels of corresponding to one of said plurality of colors of said color filter array.

\* \* \* \* \*